Nov. 10, 1964  H. W. MOORE  3,156,268
COIL WINDING MACHINE
Filed Aug. 8, 1960  3 Sheets-Sheet 1
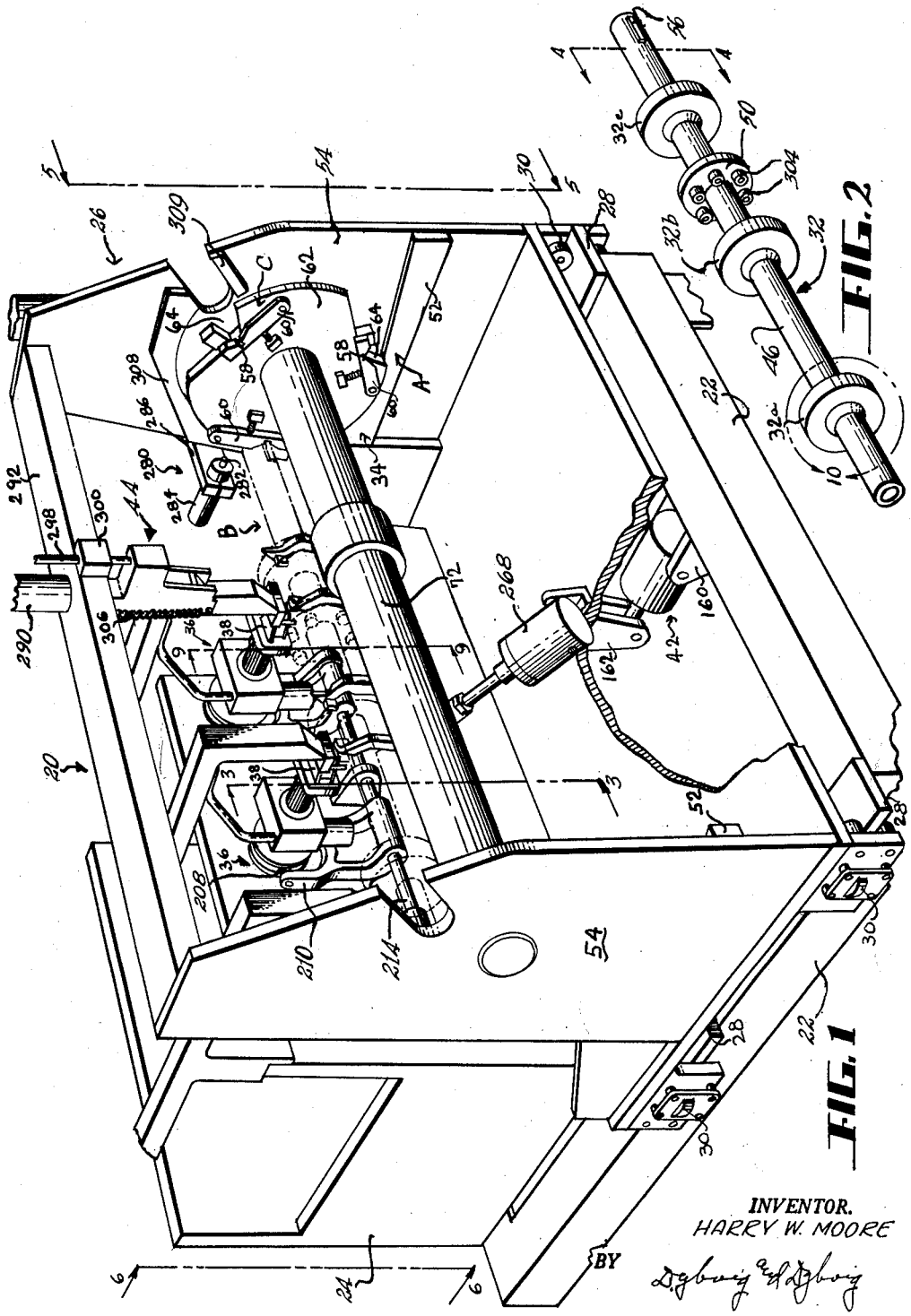
INVENTOR.
HARRY W. MOORE
BY
HIS ATTORNEYS Nov. 10, 1964
H. W. MOORE
3,156,268
COIL WINDING MACHINE
Filed Aug. 8, 1960
3 Sheets-Sheet 2
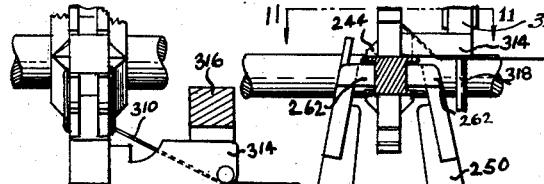
FIG. 11
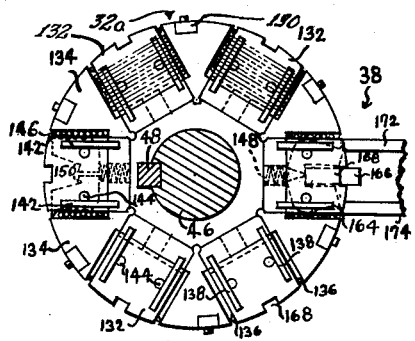
FIG. 4
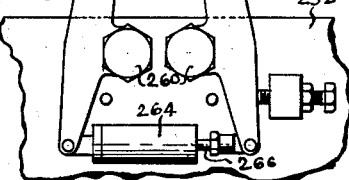
FIG. 7
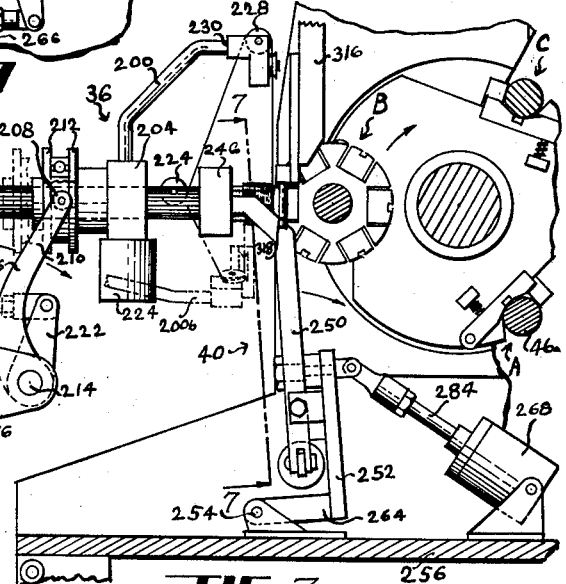
FIG. 3
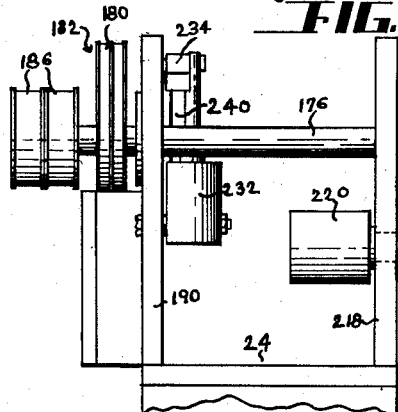
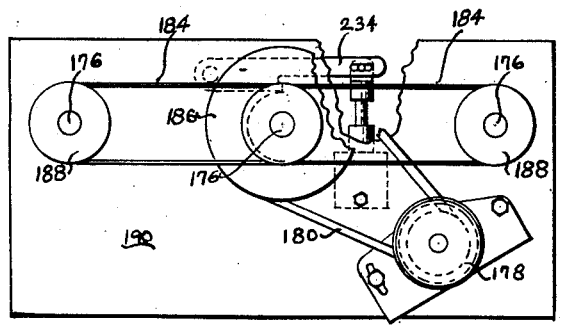
FIG. 6
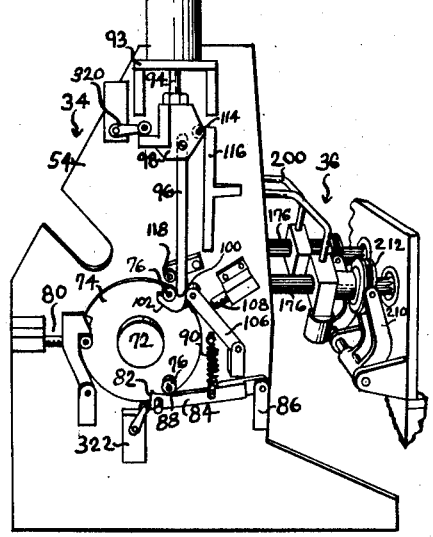
FIG. 5
INVENTOR.
HARRY W. MOORE
BY
HIS ATTORNEYS

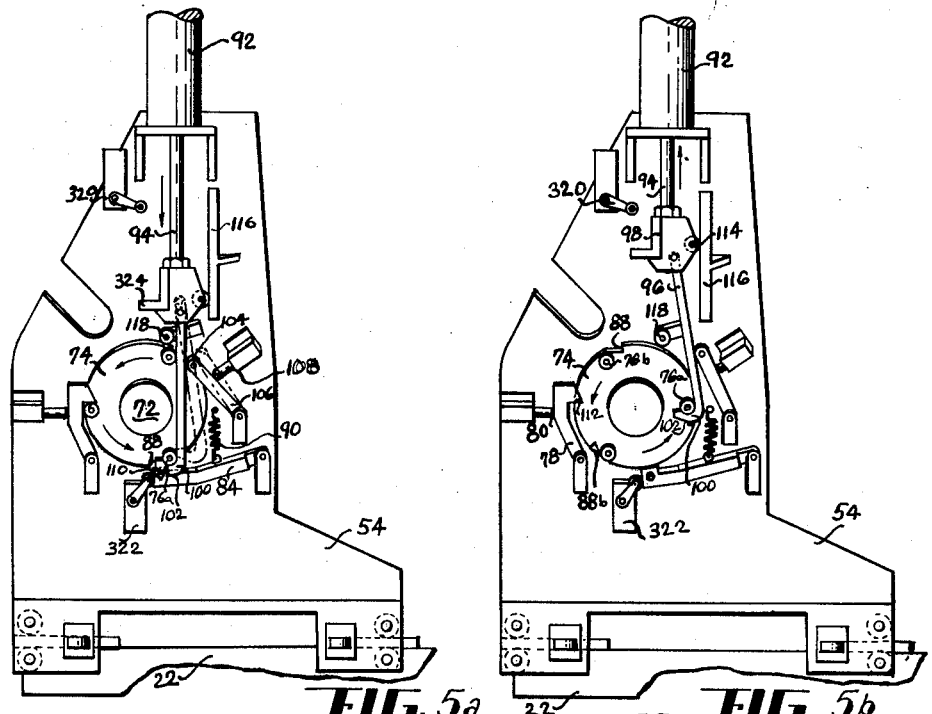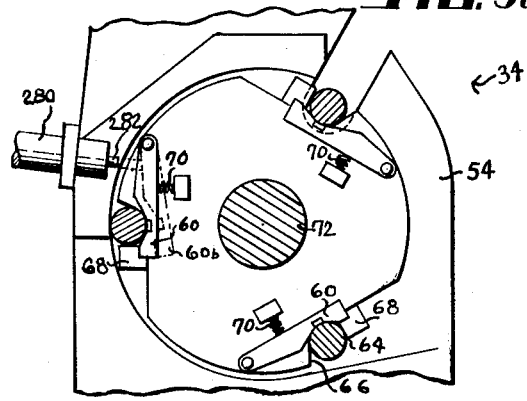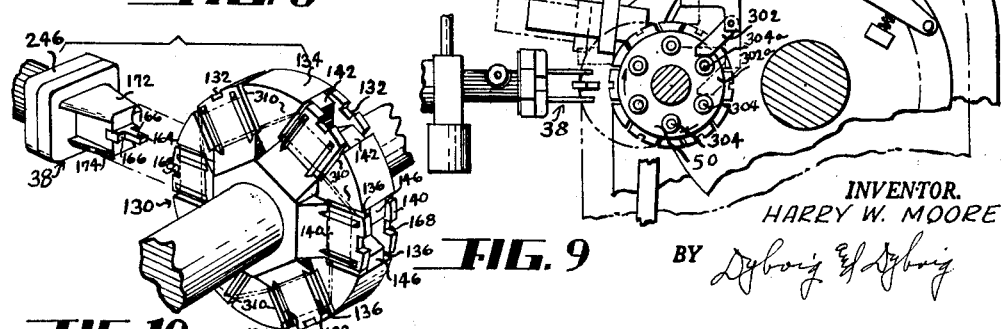

United States Patent Office 3,156,268
Patented Nov. 10, 1964

3,156,268
COIL WINDING MACHINE
Harry W. Moore, 5051 Kittridge Road, Dayton 24, Ohio
Filed Aug. 8, 1960, Ser. No. 48,081
26 Claims. (Cl. 140—71)

This invention relates to a machine used in providing a dynamoelectric device such as a polyphase motor with the necessary coil windings. More particularly, this invention relates to a machine for winding and depositing coils on a dummy field member from which coils are transferred to a field carrying member, although not necessarily so limited.

Many coil-winding machines wind coils directly in the coil-receiving slots of the field carrying member whether it be a rotor or a stator. In so winding a field member, it usually must be rotated about two or more axes to present its coil-receiving slots to a flier in proper order. Often, where the field member has inwardly directed slots, the coils are first wound on a dummy rotor or stator having outwardly directed slots and then transferred from the dummy member to the field member. Often a great portion of the latter method is performed manually. Where automatic winding machines are used, their operations and mechanisms have been quite complicated.

The primary object of this invention is to provide a coil-winding machine for depositing a plurality of coils on a dummy field member having outwardly directed slots by inserting previously wound coils into the slots.

To accomplish this object, a single coil is wound on a form and then transferred from the form to a pair of slots provided in the dummy member. Accordingly, a further object of this invention is to provide a mechanism for winding a coil on a form which is then transferred to a pair of slots provided in a dummy field member.

Another object is to provide means for indexing the dummy field member so that individual coils may be serially placed in adjacent pairs of slots provided therein.

Still another object of this invention is to provide a mechanism for simultaneously providing a plurality of dummy field members with coils. The dummy field members may advantageously be mounted on a single arbor. In this application, the terminology mandrel or accumulator structure wil be used to denote a plurality of dummy field members mounted upon a single arbor. This feature is valuable, for example, when it is desired to wind all of the phases in a stator of a polyphase motor or generator in one operation. Each dummy member is provided with the coils forming one phase. Accordingly, there would be as many dummy members on an accumulator as there are phases in the stator to be provided with coils.

A further object of this invention is to provide a transfer mechanism whereby empty dummy members are automatically placed into a coil-receiving position while the loaded dummy members are moved from the coil-receiving position to a position in which they may easily be removed from the machine.

Other objects and advantages reside in the construction of parts, the combination thereof, the method of manufacture and the mode of operation, as will become more apparent from the following description.

Referring to the drawings:

FIGURE 1 is a perspective view of the coil-winding machine of this invention with portions removed and other portions shown in section to disclose details of the coil-winding machine.

FIGURE 2 is a diagrammatic perspective view of an accumulator structure to be used in the apparatus of FIGURE 1.

FIGURE 3 is a sectional view of the winding machine taken along lines 3—3 of FIGURE 1.

FIGURE 4 is a side view of a dummy field member and a coil-winding form taken along lines 4—4 of FIGURE 2, and illustrates the manner in which the winding form engages the dummy member.

FIGURE 5 is an end view of a portion of the coil-winding mechanism as viewed in the direction of lines 5—5 of FIGURE 1. This figure shows in detail the mechanism whereby an accumulator member may be transferred or indexed to a position where it is loaded with coils and removed therefrom.

FIGURES 5a and 5b are views similar to FIGURE 5 showing the FIGURE 5 transfer mechanism in different positions of operation.

FIGURE 6 is a view of the rear of the coil-winding mechanism as viewed in the direction of lines 6—6 of FIGURE 1.

FIGURE 7 is a sectional view of a portion of the mechanism taken along the lines 7—7 of FIGURE 3.

FIGURE 8 shows in somewhat greater detail a portion of the accumulator transfer mechanism.

FIGURE 9 is a sectional view indicating the movement of a portion of the mechanism as a coil is being transferred from a coil form to one of the dummy members. This view is taken along lines 9—9 of FIGURE 1.

FIGURE 10 is a perspective view of a portion of the coil accumulator structure within arcuate line 10 of FIGURE 2, along with a coil form.

FIGURE 11 is a top view of a portion of the winding mechanism taken along lines 11—11 of FIGURE 7.

The winding mechanism 20 is mounted on a table or bed 22 and in turn on a rear support member 24 and a forward support member or carriage 26. The table 22 is provided with parallel guide rails 28 upon which ride a plurality of rollers 30 rendering the carriage movable fore and aft along the table 22.

Briefly, the purpose of the coil-winding mechanism is to deposit a plurality of coils on a coil accumulator or mandrel structure 32 including a plurality of dummy field members 32a, 32b and 32c, shown most clearly in FIGURES 2 and 4. The entire mandrel structure 32 may be inserted into the carriage 26 at an input station indicated at "A" in FIGURE 1. An arbor transfer or indexing mechanism 34, which is illustrated in FIGURES 1, 5 and 8, transfers the mandrel structure 32 to a coil-loading station indicated by the phantom lines "B" in FIGURE 1. When in the position "B," a flier mechanism 36 winds wires on a plurality of coil forms 38. The coils so wound are transferred to coil-receiving slots provided in each of the dummy members by means of a coil transfer mechanism 40 shown in FIGURES 3 and 7. Before a coil is wound on each of the forms 38, the carriage 26 is moved rearwardly by means of an hydraulic cylinder and piston arrangement 42 as will be discussed in greater detail later. The slots in the members 32a, 32b and 32c are normally blocked so that a coil may not be placed therein. However, means are provided whereby relative movement of the carriage 26 and forms 38 caused by the rearward movement of the carriage 26 serves to open the slots which are to receive the coils. After a coil is provided in a pair of slots in each of the dummy members 32a, 32b and 32c, the entire mandrel structure 32 is rotated about its axis by a mandrel rotating or indexing mechanism 44 so as to present different coil-receiving slots to the flier mechanism 36 and forms 38. After the dummy members have been completely loaded with coils, the transfer mechanism 34 moves the mandrel structure 32 to the position indicated at "C" in FIGURE 1 where the operator of the machine may either automatically or manually remove the mandrel from the carriage 26.

Each of these mechanisms will be discussed in detail in approximately the order in which they operate.

The Mandrel Structure and Transfer Mechanism

As noted before, the coil accumulator or mandrel structure 32 includes a plurality of dummy field members 32a, 32b and 32c. While three dummy members are used in the specific embodiment disclosed, more or less could be used as desired depending upon the number of phases. In the disclosed embodiment, the mandrel 32 is used for winding all phases of a three phase stator.

Each of the dummy members is fixedly attached to an arbor 46 by means of a key 48 (FIGURE 4). An indexing head 50 is similarly fixedly attached to the arbor 46. The purpose of the head 50 will be discussed later.

The mandrel structure 32 may be placed into the coil-winding machine by simply placing the ends of the arbor onto shelves or guides 52, only one of which is shown, which are mounted on opposed, parallel upright side panels 54 of the carriage 26. The arbor 46 is placed on the shelves 52 so that a key 56 at one end thereof is engaged within a slot 58 cut in a locking pawl 60 which is pivotally mounted to a first transfer plate or head 62. Three such pawls 60 are provided on the periphery of the transfer head spaced equally by substantially 120°. Each of the slots 58 overlies the center of a pocket 64 which is formed by a sloping side 66 (see FIGURE 8) of a notch provided in the head 62 and one side of an abutment 68 mounted on the other side of the notch. There are three identical pockets 64, each separated by 120°. Each of the abutments 68 encloses a spring (not shown) to bias them radially outwardly. When inserting an arbor 46 into the pocket 64 at station "A," the bias of the spring is overcome whereby the abutment 68 is forced inwardly to permit entry of the arbor. The key 56 and correspondingly the arbor 46 are held in fixed position by the locking pawls 60 under most conditions of operation by means of springs 70. The transfer head 62 is fixedly mounted upon a transfer shaft 72 which is rotatable to transfer the arbor 46 from the input station "A" to the loading station "B."

Rotation of the shaft 72 and correspondingly the first transfer plate or head 62 is accomplished in the following manner. Referring to FIGURES 5, 5a, and 5b, a second transfer plate or head 74 is fixedly attached to the shaft 72 adjacent the opposite face of the side 54 to which the head 62 is mounted. Three studs or rollers 76 are attached at equally spaced positions along the circumference of the second head 74. During most of the operation of the coil-winding machine, the head 74 is held against clockwise movement by means of a pivotally mounted latching pawl 78 which is held in a latching position by means of a spring biased finger 80. Counterclockwise rotation of the head 74 is prevented by means of a detent 82 mounted on an arm 84 which is pivotally mounted on the side 54 by means of a yoke 86 and is engaged in a notch 88 in the head 74. There are three notches 88, each located a few degrees circumferentially clockwise of the studs 76, as viewed in FIGURES 5, 5a and 5b. The detent 82 is biased into the lowermost notch 88 by means of a spring 90. When it is desired to rotate the head 74 through 120°, an air cylinder 92, which is mounted on the side 54 by means of a bracket 93, is actuated. The cylinder 92 drives a piston rod 94 having an actuating rod or arm 96 attached thereto by means of a yoke or bracket 98. Normally, a hook 100 at the bottom of the actuating arm 96 is engaged with the uppermost roller 76. However, upon downward actuation of the arm 96 by the cylinder 92, a cam surface 102 on the hook 100 engages against the lowermost roller, indicated at 76a in FIGURE 5a, which pivots the arm 96 in a counterclockwise direction as indicated by the phantom lines in FIGURE 5a. After continued movement of the arm 96 downwardly, the hook 100 clears the lower roller 76a and the arm is forced back into its normally vertical position by means of a guide roller 104 which is mounted on a pivotal arm 106. The arm 106 is biased to the left as viewed in FIGURE 5 by a spring finger 108. This causes the hook 100 to cup under the lowermost roller 76a as shown in full lines in FIGURE 5a. Simultaneously, the cam surface 102 engages a lug 110 on the side of the detent arm 84 to cam the detent 82 out of engagement with the lower notch 88 against the bias of the spring 90, thus releasing the head 74 for counterclockwise rotation. The air cylinder 92 is then energized to return the actuating arm 96 upwardly as shown in FIGURE 5b. Since the hook 100 is engaged with the roller 76a, the head 74 is thereby rotated. During rotation, the detent 82 rides along the periphery of the head 74. Near the end of the rotational movement of the head 74, the uppermost roller 76b (FIGURE 5b) engages a cam surface 112 on the latch pawl 78 thereby pivoting it out of position against the bias of the spring finger 80. At the termination of the upper movement of the arm 96, the detent 82 is biased into the notch 88b (FIGURE 5b).

The cycle of operation just described may be repeated so that the linear up and down movement of the arm 96 under actuation of the air cylinder 92 results in a step by step rotary movement of the two transfer heads 62 and 74 to successively move an arbor 46 from the input station "A" to the loading station "B" and thence to the output station indicated at "C" in FIGURE 1. Since the key 56 on the arbor 46 is locked in position by the slot 58, the dummy members are accurately aligned in the loading position "B." The transfer mechanism, utilizing the detent 82, the latch pawl 78 and the hook 100, accurately transfers the arbor 46 by 120° about the shaft 72 each time the cylinder 92 is actuated. To enhance positive operation of the transfer mechanism, the yoke 98 is provided with a guide roller 114 which is guided along a bracket 116 mounted on the side panel 54. A second, but fixed, guide roller 118 likewise mounted on the panel 54, prevents clockwise rotation of the rod 96 about its pivot on the yoke 98. The third guide roller 104, which has already been described, limits pivotal counterclockwise movment of the arm 96 so that it is constantly guided in the same path.

With the mandrel or accumulator structure 32 in the loading position "B," shown in FIGURE 1, each of the dummy members 32a, 32b and 32c is shown in a position to receive coils of wire. Since each of the dummy field members is identical in structure, only one of them will be described. Referring to FIGURES 4 and 10, the dummy member 32a comprises a substantially cylindrical block 130 which is fixedly attached to the arbor 46 by means of a key 48 as previously mentioned. A plurality of coil-receiving portions 132 are equally spaced about the periphery of the block 130, the portions 132 being separated by wedge shaped portions 134. There are six such coil-receiving portions shown in FIGURE 4. However, the number of coil-receiving portions may vary as desired. In the specific embodiment, it is contemplated that the dummy field members 32a, 32b and 32c accommodate six coils each so as to form the entire number of coils used in one phase of a three phase stator.

Since the portions 132 are identical in construction, only one will be described. Each portion 132 is generally rectangular in shape, having sides contiguous to a parallel pair of slots 136, each slot 136 being cut into the periphery of the block 130 along a line parallel to the radius of the block 130 which extends midway between the pair of slots. A pair of spacer bars 138 extend parallel to and adjacent each slot 136 on each side of the block 130 so that a coil, such as that indicated at "L" in FIGURE 4, when deposited on the member 32a extends into the parallel slots 136 and around the spacer bars 138. The spacer bars 138 are provided so that there is a slight separation between the sides of the coil-receiving portions 132 and the coil deposited thereon. Accordingly, the operator of the mechanism may insert his fingers underneath the coil or, as will be described below, mechanical fingers may engage the coil and extend between the coil and the sides of the portions 132.

While the mandrel structure thus far described is adequate to receive coils from a coil form 38, which will be described later, the danger is present that parts of a coil once deposited on the accumulator may slide or unravel out of the parallel slot pairs 136 during subsequent operations. Accordingly, means are provided to lock the coils within the slots 136. Each of the coil-receiving portions 132 includes a pair of parallel, spaced side plates 140 which are integral with the block 130, as shown in FIGURE 10. A pair of locking plates 142 are rotatably mounted on pins 144 (FIGURE 4) fixed in the side plates 140. The outermost portion of each plate 142 is provided with a flange 146 which extends across the adjacent slot 136. A spring 148 is housed in a radially extending aperture provided centrally of the base of each coil-receiving portion 132. The spring 148 normally exerts an outward bias on a pair of flanges 150 provided on the adjacent plates 142, so that the plates 142 are biased about the pins 144 causing the flanges 146 to block the adjacent slots 136. The flanges 150 are slightly separated so that the upper faces thereof may be urged radially inwardly to pivot the plates 142 against the bias of the spring 148, thus opening the slots 136. This may be accomplished manually but, as will be described below, means are provided for automatically opening the slots 136 upon relative movement of the carriage 26 and the rear support 24.

The mechanism thus far described accurately transfers an accumulator 32 from the input station "A" to the loading station "B" wherein one of the slot pairs 136 in each of the dummy members 32a, 32b and 32c is held adjacent a coil-receiving form 38. The particular manner in which the accumulators engage the coil-receiving forms 38 the structure of the forms 38 and the manner in which coils are wound thereon will now be discussed.

Flier Mechanism and Coil-Receiving Form

As an accumulator or mandrel structure 32 moves from the position "A" to the position "B," the flier mechanism 36 is inactive. Also, the carriage 26 occupies a position forwardly of the table 22. When an accumulator structure 32 is in the loading position "B," the hydraulic cylinder 42, which is attached between the table 22 and the carriage 26 by means of yokes 160, 162, is energized to move the carriage rearwardly, that is to the left as viewed in FIGURE 3. As the carriage moves rearwardly, a tang or abutment 164 (FIGURE 4) attached to the front of each form 38 enters the gap between the plates 140 on the coil-receiving portions 132. The forward face of the tang 164 engages the top faces of the flanges 150, thereby overcoming the bias of the springs 148 to open the adjacent coil-receiving slots. Note the right side of FIGURE 4.

The rear portion of each tang 164 is widened to provide a key 166 which engages a notch 168 provided in each of the plates 140. With this construction, one pair of slots 136 on each accumulator is accurately positioned to receive coils from the adjacent form 38. Note that the sides of the portions 132 are substantially coplanar with the tapered top and bottom faces 172, 174 respectively, of each of the coil forms 38.

The flier mechanism 36 includes three drive shafts 176, there being one drive shaft for each of the three winding forms 38. As shown in FIGURES 3 and 6, the drive shafts 176 are driven by a motor 178 which is connected by a double belt 180 to a driven pulley assembly 182. The pulley assembly 182 is directly connected to the central drive shaft 176. The drive shafts 176 to each side of the central shaft are driven at the same speed as the latter shaft by timing belts 184 attached to pulleys 186 on the central shaft 176 and pulleys 188 on each of the adjacent shafts 176. The shafts 176, along with the pulley assembly and motor 178, may be mounted on a vertical wall panel 190 located rearwardly on the rear support 24.

Since the structure of each flier assembly mounted on the shafts 176 is identical, only one will be described. As shown in FIGURE 3, each flier assembly includes the usual flier arm 200. The forward portion of the shaft 176 upon which it is mounted is provided with a plurality of grooves or splines 202. Similarly, the flier arm 200 is mounted on a support block 204 which is splined internally to slidably engage with the splines 202. The flier is moved axially of the shaft 176 by a driving fork 206 having inwardly directed pins 208 mounted adjacent the ends of the arms 210 thereof. The pins 208 engage between a pair of spaced annular flanges 212 which are integral with the support blocks 204. The base of the fork 206 is fixedly mounted upon a transversely extending shaft 214 which is rotatably journalled within a plurality of brackets 216 attached to a forward vertical wall panel 218. Rotation of the shaft 214 is effected by a flier actuating air cylinder 220, likewise mounted on the panel 218, which drives the shaft 214 through a crank arm 222. The air cylinder 220 is constructed so as to slowly rotate the shaft 214 in a counterclockwise direction and accordingly move the flier arm 200 rearwardly, that is to the left as shown in FIGURE 3, but to rapidly return the flier arm 200 to its starting position to the right as viewed in FIGURE 3.

It is believed that the operation of the flier mechanism is obvious. As the shafts 176 are rotated by the motor 178, the flier arms 200 are likewise rotated due to the splined connection between the forward portion of the shafts 176 and the support blocks 204. During rotation of the shafts 176, the air cylinder 220 moves the blocks 204 rearwardly. To reduce vibration of the flier mechanisms, a counterbalance 224 is mounted on each support block diametrically opposite the flier arms 200. A wire supply (not shown) for each flier arm 200 is located to the left of the mechanism in FIGURE 3. Lengths of wire are coursed through an aperture in each shaft 176 around a pulley 226 mounted on each shaft 176 and around a pair of pulleys 228 mounted on each flier head 230. The wire is then wound around the form 38.

The three flier arms 200 are simultaneously rotated a desired number of revolutions to wind a coil of wires on the three forms 38. The rotation of the flier arms 200 is then stopped so as to permit subsequent operations to take place. Stopping the fliers automatically after winding a coil with the desired number of turns is well known in the art. See Moore patents, Number 2,627,379 and 2,942,793. The timing mechanism used to control the number of revolutions of the arm 200 may taken any conventional form. For example, the motor 178 could be an hydraulic motor which is controlled by valves (not shown) which in turn are controlled by timing cams driven by one of the shafts 176. The valves serve to slow the motor during the last few revolutions of the arm 200. The same timing cams could energize and deenergize an hydraulic cylinder 232 which is connected to a pivotally mounted brake arm 234 having a stop surface 236 adapted to engage within a spiral groove 238 provided in a brake pulley 240 fixedly mounted upon the central shaft 176. A cooperating stop surface 242 is provided on the brake pulley 240 at the end of the groove 238, which engages the stop surface 236 to bring the shafts 176 to a full stop.

As shown in FIGURES 7 and 10, the upper plate 172 and the lower plate 174 of each of the coil winding forms 38 are mounted upon a central core 244 of reduced width. The forms 38 are attached to a bearing structure, generally indicated at 246, which in turn are rotatably mounted on the shafts 176. Since the forms 38 are held in a fixed position by their engagement with the notches 168 in the dummy members, the forms remain stationary while the drive shafts 176 are rotated.

Coil Transfer Mechanism

The coil transfer mechanism 40 comprises a plurality of tongs 250, there being one tong 250 for each form 38.

Each of the tongs 250 is mounted upon a plate 252 which is pivotally mounted on a bracket 254 fixedly attached to the floor 256 of the carriage 26. Each tong member comprises a pair of arms 258, each of which is rotatably mounted by means of bolts 260 to the pivotally mounted plate 252. Each arm 258 has a finger on flange 262 at the upper end thereof which extends toward the other arm. The fingers 262, as shown in FIGURE 7, are adapted to engage behind a coil wound on an adjacent form 38 within the channel defined by the upper and lower plates 172, 174 respectively and the central core 244. However, each pair of arms 258 is normally pivoted so that the fingers 262 are separated by a distance greater than the thickness of the forms 38 and the dummy members by means of an air cylinder 264 having a double acting piston 266. Also, the plate 252 is normally pivoted forwardly, as shown in FIGURE 1, so that the arms 258 normally straddle the cooperating dummy members. The wire carried by the fliers may accidentally engage the arms 258. However, the wire would first contact an upwardly extending tapered finger 267 (FIGURE 7) provided on one of the arms 258 and slide away from the arms.

After coils are wound on the forms 38, as indicated by phantom lines is FIGURE 3, an air cylinder 268 is energized. The cylinder 268 is pivotally mounted at one end to the floor of the carriage 26 and at its other end to the plate 252. Upon actuation, the plate 252 is pivoted rearwardly, that is to the left as viewed in FIGURE 3. The arms 258 then occupy the position shown in FIGURE 3 wherein the fingers 262 straddle the channels in the forms 38. Subsequently, the cylinders 264 of each tong structure 250 are energized to thrust their pistons outwardly, whereby the lower ends of the arms 258 are separated, causing the upper portions of the arms to pivot about the bolts 260 so that the fingers 262 engage within the channels of the forms 38 behind the coils wound thereon, as illustrated in FIGURE 7.

After the fingers 262 have become engaged behind the coils on the forms 38, the cylinder 268 is energized to return the plate 252 to its FIGURE 1 position, whereby the fingers 262 force the coils wound on the forms 38 into the coil-receiving slot pairs 136 aligned with the top and bottom of the forms 38. Since all of the tong structures 250 are mounted on the plate 252, each of the coils mounted upon the forms 38 will be simultaneously inserted into the coil-receiving slots on the three dummy members 32a, 32b and 32c. Once the coils are so inserted, the piston 266 is then energized to return the arms to the FIGURE 1 position wherein the fingers straddle the dummy members.

*Arbor Rotating or Indexing Mechanism*

After the first set of coils is transferred from each of the winding forms 38 to one of the coil-receiving portions 132 of each of the dummy field members, the dummy members must necessarily be repositioned to place empty coil-receiving portions 132 into alignment with the coil forms 38. The initial step in indexing the accumulator structure 32 is performed by the cylinder 42, which returns the carriage 26 forwardly of the support 22. When this is done, the abutments 164 on the forms 38 are removed from the locking plates 142 so that the coil-receiving slots provided with coils are again blocked.

After the carriage 26 is returned to its forward position, a pawl release 280 is actuated. The release 280 comprises a plunger 282 actuated by an hydraulic cylinder 284 and is affixed to the right (FIGURE 1) wall panel 54 by a bracket 286. The forward face of the plunger pivots the latching pawl 60 located at station "B" out of latching engagement with the key 56 on the arbor 46, as indicated by phantom lines 60b in FIGURE 8. The arbor 46 is then released so that it may be rotated about its longitudinal axis by the indexing mechanism 44.

As shown in FIGURES 1 and 9, the mandrel rotating or indexing mechanism 44 comprises an indexing cylinder 290 mounted upon a carriage beam 292 extending between the upper portion of the side panels 54. The cylinder 290 actuates an indexing rod 294 downwardly. Initial movement of the rod 294 likewise moves an indexing head 296 attached thereto downwardly from the position indicated by the phantom lines 296a to that indicated by full lines in FIGURE 9. The path of the indexing head 296 is guided by a guide rod 298 which extends from the head through an aperture provided in a guide block 300 mounted on the beam 292. As the indexing head 296 moves downwardly, an indexing finger 302 pivotally mounted thereon engages one of a plurality of indexing studs or rollers 304 mounted on the indexing disc 50 which is fixedly attached to the arbor 46. A stop (not shown) prevents clockwise rotation of the finger 302 from the full line position in FIGURE 9 while spring means (not shown) hold the finger 302 in the full line position. As shown in FIGURE 1, the lower portion of the head 296 may be bifurcated to receive the finger 318. The spring means may be located between the furcations.

In the full line position shown in FIGURE 9, the finger 302 has just engaged the roller indicated by reference character 304a. Upon continued downward movement of the head 296, the finger 302 is lowered to the position shown by phantom lines 302a, thus causing the accumulator structure 32 to rotate about its axis. Since there are six coil-receiving portions 132 on each dummy member, there are likewise six indexing studs or rollers 304 mounted on the indexing disc 50. Accordingly, the indexing finger 302 causes the arbor 46 to rotate by 60° each time it is actuated downwardly to present an empty pair of slots 136 adjacent each of the forms 38.

When the finger 302, shown in FIGURE 9, occupies the phantom line position 302a, the lower face of the finger engages the top of one of the indexing rollers while the nearest roller in a counterclockwise direction is engaged with the upper side of the finger. Thereby, the indexing disc 50 and accordingly the arbor 46 are held against rotation in either a clockwise or a counterclockwise direction. The carriage 26 is then moved from the full line position shown in FIGURE 9 to that indicated by the phantom lines 26a. That is, the carriage is moved rearwardly by means of the cylinder 42 whereby the aforementioned empty coil-receiving slots in each of the dummy members are aligned with the forms 38. Rotation of the dummy members is again prevented by engagement of the keys 166 within the notches 168 provided centrally of the coil-receiving portions 132. Once the keys 166 and notches 168 are interengaged, the cylinder 290 may then be deenergized whereupon the indexing head 296 is returned to its starting position by a spring 306.

The entire procedure for winding coils of wires on the forms 38 and transferring these coils to the empty slots 136 is then repeated. The indexing operation is likewise repeated until each of the slot pairs 136 is loaded with a coil. Thereafter, the transfer mechanism 34 is again energized to move the accumulator or mandrel structure 32 from the loading station "B" to the output station "C" for removal from the winding machine. During movement from position "B" to position "C," the arbor 46 is held within its pocket 64 by a guide plate 308. To insure that the arbor does not fall after reaching the position "C," a stop ledge 309 is mounted in each wall panel 54 adjacent position "C" for holding the ends of the arbor 46 until it is removed by the operator or by suitable automatic mechanisms.

*Review of Operation*

An arbor 46 is inserted onto the shelves 52 provided on each of the side panels 54. The end of the arbor provided with the key 56 is thus locked within the pocket 64 located at the station "A." The other end of the shaft may be locked in a similar pocket (not shown). The transfer mechanism 34 is then energized to rotate the transfer shaft 72 about its axis so as to move the mandrel or accumulator structure 32 to the loading position "B." The carriage 26 is then moved rearwardly, as viewed in FIGURE 1, by the cylinder 42 so that a pair of coil-receiving slots 136 in each of the dummy members 32a, 32b and 32c is aligned with the top and bottom of a cooperating coil-winding form 38. Simultaneously, the abutments 164 extending forwardly of the forms 38 cause the plates 142 located within the aforementioned slots to pivot, whereby the blocking flanges 146 are moved out of the adjacent slots 136. The fliers are then actuated to wind coils of wire, each having the same predetermined number of turns, by winding from the front, or the right, as viewed in FIGURE 3, to the rear of the forms.

The position of the flier arms 200 when the coils have been completely wound upon the forms is indicated by the phantom lines 200b in FIGURE 3. The coil transfer mechanism 40 is then energized whereby the tongs 250 move from their FIGURE 1 to their FIGURE 3 position. Immediately thereafter the cylinder 264 is energized so that the tong fingers 262 engage behind the coils on the form 38. The cylinder 268 then draws the tongs 250 to the right, as viewed in FIGURE 3, whereby the coils are inserted into the coil-receiving slots 136.

Since the flier heads 230 are located to the sides of the shafts 176, as indicated by the phantom lines 200b in FIGURE 3, the coil lead-in wires, that is the portion 310 of the wire forming the coils which extends from each coil to the flier head 230 is coursed through an aperture 312 in a wire guide block 314 which is mounted upon a vertically extending flange member 316. The wire portion 310 is also coursed around a guide finger 318 which depends vertically from the block 314 (FIGURE 11). After the coils are inserted into the slots, the carriage 26 is returned forwardly to the position shown in full lines in FIGURE 9. The mandrel structure 32 is then indexed by 60° so that an empty pair of coil-receiving slots 136 in each dummy member is positioned adjacent the forms 38. The carriage is again moved rearwardly to the position indicated by the phantom lines 26a in FIGURE 9, whereupon the aforementioned pairs of empty coil-receiving slots 136 are placed into position to receive coils from the coil forms 38. Since the wire portion 310 is coursed through the aperture 312 and around the fingers 318, there is no danger that it will become tangled. By this time, the fliers have been returned to their starting position (not shown), which is to the right of the position indicated by the phantom lines 200b in FIGURE 3, wherein they begin to layer a new coil of wires on each winding form 38. The operation of the coil transfer mechanism 40 is repeated after the second coils have been layered upon the forms 38. These operations are continued until each of the coil-receiving slot pairs 136 in the members 32a, 32b and 32c have been loaded with coils. The arbor transfer mechanism 34 is then again actuated to rotate the mandrel structure 32 to the output position "C." While the mandrel structure located at the position "B" is being loaded with coils, another arbor, indicated at 46a in FIGURE 3, may be positioned at station "A." Thus is is apparent that the mechanism may be continuously operated without interruption.

No attempt has been made in this application to disclose the control circuits making it possible to automatically operate the various mechanisms used in the machine. It should be apparent, however, that by providing suitable sensing devices, automatic sequential operation is possible. Such sensing devices may take the form of microswitches such as switches 320, 322 shown in FIGURES 5, 5a and 5b. The microswitch 320 may be engaged by a flange 324 mounted upon the yoke 98 so as to be actuated at the termination of the operation of the transfer mechanism 34. Accordingly, the microswitch 320 could control circuitry which energizes the flier drive motor 178. The microswitch 322 could sense the proper operation of the actuating arm 96 and its hook 100 when cupped beneath the lowermost stud or roller 76a to control circuitry which causes the cylinder 92 to pull the arm 96 upwardly to rotate the transfer plate 74 by 120°. Similar microswitches along with suitable timing devices could be placed elsewhere in the apparatus to control its other functions.

The loaded mandrel or accumulator structures 32 are, of course, used in providing coils in inwardly directed slots of an actual field member (not shown). It is obvious that each of the dummy members 32a, 32b and 32c could be inserted within an annular field member and the coils deposited in the slots 136 could be moved manually or by suitable mechanisms to the inwardly directed slots in the field member. The prior practice has been to provide radially extending slots in dummy field members such as the members 32a, 32b and 32c. However, several advantages are presented when using parallel pairs of slots 136 provided by the instant invention. Of course, it would be impractical to transfer coils from the forms 38 to the slots 136 if the slots 136 were radially directed, since the dimensions between the slots would be constantly changing, and the coils would become contracted or misshapened upon their insertion into the slots. By using parallel slots, the shape of the coils upon transferral from the forms 38 to the slots 136 is changed only slightly. This change is caused by the taper of the upper and lower surfaces 172 and 174 of the forms 38 inwardly from back to front. The taper of the forms 38 is desirable since the coils wound thereon are more easily removed therefrom. However, the taper is not so great as to cause damage to the coils when inserted into the parallel slots. The parallel slot feature is also valuable when moving the coils from the slots 136 into the inwardly directed slots of the annular field member, since again, the coils need not be expanded or contracted.

With the mechanism described above, coils may be accurately deposited on the accumulators. The operation of the device is extremely rapid in that a plurality of accumulators may be loaded simultaneously. With the blocking plate arrangement for blocking the coil-receiving slots, the danger that the coils will unravel is reduced to a minimum. Accordingly, the percentage of rejects using the coil-winding machine has been found very small. The accuracy of the device is enhanced by the fact that the position of the arbor 46 is under complete control of the comparatively simple transfer and indexing mechanisms described above. Since a separate and stationary coil form 38 is used for each of the dummy members, the members may be completely loaded with coils by merely sequentially rotating the accumulator structure about its axis by the indexing mechanism 44. The resulting flier and accumulator indexing mechanisms are considerably less complex than conventional mechansims used in the past.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a mechanism for depositing coils on a dummy field member having a plurality of pairs of coil-receiving slots, the combination comprising: a winding form; means for winding coils upon said form; means supporting the dummy member adjacent the form with one pair of slots being in position to receive a coil wound on said form; means for transferring the coil wound upon said form to said one pair of coil-receiving slots; and means for indexing said dummy member to present a different pair of coil-receiving slots in position to receive coils from said form.

2. The combination of claim 1 in which said means for winding coils includes a rotatable shaft and a flier mounted on said shaft for rotation therewith and wherein said winding form is mounted on the end of said shaft.

3. The combination of claim 1 wherein said dummy member is mounted upon an arbor upon which is mounted a plurality of identical dummy members.

4. In a coil winding machine, the combination comprising: an arbor; a dummy field member mounted on said arbor, said dummy field member having a plurality of pairs of coil-receiving slots equally spaced about the periphery thereof, a support for said arbor, said support including a guide member upon which said arbor is placed, a transfer mechanism including a rotatable plate provided with a plurality of pockets within one of which the end of said arbor is positioned, means for indexing said plate, whereby said arbor is placed upon said guide means within one of said pockets and said plate is indexed to rotate said plate positioning said arbor at a loading station where coils are inserted into the coil-receiving slots, and after the dummy member is completely loaded with coils, the arbor is moved by said transfer mechanism to an output station wherein the arbor is removed from said machine.

5. The combination of claim 4 further including locking means mounted adjacent each of said pockets for retaining said arbor in a fixed position relative thereto, an arbor rotating means for indexing said dummy member, whereby coils may be inserted into a first pair of slots in each dummy member and said rotating means energized to place a second pair of slots in position to receive coils, and means for disengaging said locking means from said arbor, so that said second indexing means may rotate said arbor within said pocket.

6. In a coil winding machine, the combination comprising: an arbor; a plurality of dummy field members mounted on said arbor, each of said dummy field members having a plurality of pairs of coil-receiving slots equally spaced about the periphery thereof, a support for said arbor, said support including a guide member upon which said arbor is placed, a transfer mechanism including a rotatable plate provided with a plurality of pockets within one of which the end of said arbor may be positioned, means for indexing said plate, whereby said arbor may be placed upon said guide means within one of said pockets and said plate may be indexed to rotate said plate to position said arbor at a loading station wherein coils are inserted into the coil-receiving slots, and after the dummy members are completely loaded with coils, the arbor may be moved by said transfer mechanism to an output station wherein the arbor may be removed from said machine.

7. The combination of claim 6 further including locking means mounted adjacent each of said pockets for retaining said arbor in a fixed position relative thereto, an arbor rotating means for indexing said dummy members, whereby coils may be inserted into a first pair of slots in each pair of dummy members and said rotating means energized to place a second pair of slots in position to receive coils, and means for disengaging said locking means from said arbor, so that said second indexing means may rotate said arbor within said pocket.

8. The combination of claim 6, wherein said first mentioned transfer means includes an indexing plate having a plurality of studs mounted about the periphery thereof at equally spaced points, an actuating rod provided with a hook for engaging said studs, means for reciprocating said actuating rod whereby the hook on said rod moves in one direction wherein it engages a stud and then is returned in the opposite direction with said stud to rotate said plate, a detent mounted adjacent said plate for preventing rotation of said plate, said detent being disengaged from said plate by said actuating rod upon termination of the movement thereof in said one direction.

9. The combination of claim 7, wherein said arbor rotating means includes a vertically reciprocable arm adapted to engage studs on an indexing disc fixedly attached to said arbor, the lower portion of said arm engaging one of said studs upon initial downward movement thereof to move said one of said studs downwardly with said arm, said arm at its lowermost position being engaged with said one of said studs and another stud spaced from said one of said studs whereby rotation of said disc is prevented in either a clockwise or counter-clockwise direction.

10. In a coil winding machine, the combination comprising: a dummy field member having a plurality of pairs of coil-receiving slots equally spaced about the periphery thereof; a winding form; means supporting the dummy member adjacent the form; means for sequentially winding coils on said form, transfer means for sequentially transferring a coil wound on said form to a pair of slots in said dummy member, and means for indexing said dummy member after each coil is transferred thereto whereby a different pair of slots in said dummy field member is provided with a coil upon each operation of said transfer means.

11. A coil winding machine comprising: an arbor, a dummy field member mounted upon said arbor, said dummy field member being provided with a plurality of pairs of coil-receiving slots; a reciprocable carriage, support means mounted upon said carriage for supporting said arbor; a winding form adjacent said carriage; means for sequentially winding coils of wires upon said winding form; a transfer mechanism mounted upon said carriage and engaged with said arbor for transferring the arbor placed upon said support means to a position adjacent said winding form; means for moving said carriage to a position wherein the dummy member mounted thereon engages said form such that a first pair of coil-receiving slots provided in said dummy member is positioned to receive coils from said form; coil transfer means for sequentially moving a coil wound on said form into said pair of slots; means for returning said carriage away from said form after a coil has been deposited in said first pair of slots; and arbor indexing means for rotating said arbor after return of the carriage whereby the field member mounted thereon is rotated to sequentially present different pairs of coil-receiving slots to said form, said carriage being reciprocated after each coil has been transferred, whereby a different pair of slots is provided with a coil upon each operation of said coil transfer mechanism.

12. The machine of claim 11 in which a plurality of field members are supported on said arbor, and in which there are a plurality of winding forms, there being one form for each member, whereby a plurality of coils may be simultaneously deposited on said dummy member.

13. In a coil winding machine, the combination comprising: a dummy field member having a plurality of pairs of coil-receiving slots spaced about the periphery thereof; means blocking each of the slots preventing entry or removal of coils; a winding form, means for winding coils of wire upon said form; support means holding said dummy member adjacent said form but spaced therefrom; means for causing relative movement between said form and said dummy member whereby a pair of slots in said dummy member are positioned to receive a coil wound on said form; and means responsive to said relative movement for moving the blocking means out of said pair of slots.

14. The combination of claim 13, in which said blocking means includes a plurality of pivotally mounted blocking plates, there being one plate adjacent each slot, means biasing each plate so that a portion thereof extends across its adjacent slot, and in which said means responsive to said relative movement includes an abutment on said form which engages a pair of said plates overcoming the bias means acting thereon, whereby said pair of plates are pivoted to open the adjacent pair of slots.

15. The combination of claim 13, in which said dummy field member is fixedly mounted upon an arbor upon which are mounted a plurality of identical field members, and wherein there are a plurality of identical forms and means for winding wires upon said forms, whereby a plurality of coils may be wound simultaneously upon said forms.

16. For use in a coil winding machine, a dummy field member comprising: a block having a plurality of pairs of coil-receiving slots equally spaced about the periphery thereof; a plurality of pivot pins mounted in said member, there being one pivot pin adjacent each slot, a plurality of blocking plates, there being one plate pivotally mounted on each pin, each of said plates including a first flange extending on one side of its pivot pin, a second flange extending on the other side of the pivot pin from said first flange; and spring means engaged with the second flange of each plate for biasing the plates to a position wherein the first flange extends across its adjacent slot; each of said second flanges being positioned for engagement by an abutment on the coil winding machine whereby the bias of said spring means may be overcome to remove the first flange from its adjacent slot.

17. For use in a coil winding machine, the combination comprising: an arbor, a cylindrical dummy field member mounted upon said arbor having a plurality of pairs of coil-receiving slots about the periphery thereof, a plurality of pairs of blocking plates, each plate being pivotally mounted within said dummy member, there being one pair of plates between each of the two slots forming a pair of coil-receiving slots, a first flange on each plate on one side of a pivot for each plate, a second flange on each plate being mounted on the other side of the plate and means biasing said second flanges of each pair of plates radially outwardly, whereby the first flange of each plate extends across its adjacent slot to block said slot.

18. In a coil winding machine for depositing coils on a dummy field member which is mounted upon an arbor, a transfer mechanism for receiving said arbor and transferring said arbor into a position wherein the dummy member mounted thereon may be loaded with coils comprising: a support, a shaft rotatably mounted upon said support; a first plate mounted upon said shaft, said first plate having a cut-out portion providing a pocket for receiving said shaft, means for retaining said shaft in said pocket; a second plate fixedly mounted upon said shaft, a plurality of studs mounted upon said second plate; an actuating arm having a hook portion engaged with one of said studs; means moving said actuating arm out of engagement with said one stud into engagement with a second stud and for returning said actuating arm to its initial position whereby said second stud is carried by said hook with said actuating arm, thereby rotating said second plate and accordingly the shaft and the first plate; and a detent means engaged with said second plate for preventing such rotation of said plate, said detent means being engaged by said actuating arms upon movement thereof to permit the second plate to rotate.

19. In a coil winding machine, the combination comprising: a coil form, a dummy member having a plurality of coil-receiving slots, means supporting said dummy member adjacent said coil form with a pair of said slots in position to receive coils wound on said form, tong means for transferring a coil wound on said form to said pair of slots, said tong means comprising a plate pivotally mounted beneath said form and said dummy member, a pair of arms pivotally mounted upon said plate, a finger mounted on each of said arms adjacent one end thereof adapted to engage said form behind a coil wound thereon, means engaged with said arms for holding one end thereof apart with said fingers straddling the form and the dummy member, means for pivoting said plate whereby the tongs mounted thereon are moved from a first position wherein the fingers straddle said dummy member to a second position wherein said arms straddle said coil form, means for pivoting said arms when in said second position so that the fingers on said arms engage the form behind the coils mounted thereon and means for returning said plate to said first position to move the arms into a position wherein they straddle the dummy member, whereby the coils are removed from the form to the coil-receiving slots in the dummy member.

20. In a coil winding machine, the combination comprising: a plurality of rotatable drive shafts, a flier mounted upon each drive shaft for rotation therewith, a plurality of coil winding forms, support means mounting one of said forms upon each drive shaft in position to receive a coil of wires from the flier mounted therein, means for driving each of said shafts in synchronism to wind coils on said forms, and means for preventing said forms from rotating while said shafts are rotating.

21. A device for winding coils for use as windings in a polyphase stator having internally directed teeth, the combination including: a plurality of forms, there being one form for each phase, a plurality of fliers, there being one flier for each form, means for rotating said fliers in unison for winding a coil for each phase, a plurality of arbors, each arbor supporting a plurality of dummy members, there being one dummy member on each arbor for each phase of the stator, a rotary support for supporting said arbors, each of the dummy members being provided with pairs of peripheral slots, the number of pairs of peripheral slots on each dummy member corresponding to the number of coils in each phase of the stator windings, means for registering a pair of slots of each of the dummy members of one arbor with the forms, means including tongs for transferring the coils on the forms to the registering slots of the dummy members, means for indexing the dummy members on said one arbor so as to present a succeeding pair of slots on each dummy member with the respective forms, repeating the winding operation and the indexing of the dummy members cyclically until all of the coils of each phase have been wound, and means for removing the arbor with the wound coils on the dummy members from the forms and for presenting a second arbor with the dummy members therein in register with the forms.

22. A device for winding coils for use as windings in a polyphase stator having internally directed teeth, the combination including: an arbor, a plurality of dummy field members mounted upon said arbor, there being one dummy field member for each phase, each of said dummy field members being provided with a plurality of pairs of coil-receiving slots, a reciprocable carriage, support means mounted upon said carriage for supporting said arbor, a plurality of winding forms adjacent the said carriage, there being one winding form for each phase, means for sequentially winding coils of wires upon said winding forms, and transfer mechanism mounted upon said carriage and engaged with said arbor for transferring the arbor placed upon said support means, means for moving said carriage to a position wherein the dummy members mounted thereon engage said forms such that a first pair of coil-receiving slots on each of the dummy members is registered with a form, coil transfer means for sequentially removing coils wound on said forms into the registering pair of slots, means for returning said carriage away from said forms after the coils have been deposited in said slots, and arbor indexing means for rotating said arbor after return of the carriage whereby the dummy members mounted thereon are rotated to sequentially present different pairs of coil-receiving slots to said forms, said carriage being reciprocated after each coil has been transferred whereby a different pair of slots is provided with coils upon each return of said coil transfer mechanism.

23. A device for winding coils according to claim 22, wherein the coil transfer means includes a plurality of pairs of tongs, there being one pair of tongs for each phase, said tongs being mounted for movement with respect to said forms to remove the coils axially from the forms and into the slots of the dummy members.

24. A coil winding machine including a circular dummy member having a plurality of substantially parallel slots, each pair of slots extending parallel to a radius of the dummy member, a plurality of pairs of blocking members for closing the outer ends of the slots, resilient means for biasing the blocking members to close the ends of the slots, and a radially mounted member for removing the blocking members to open the ends of the slots.

25. In a coil winding machine, the combination comprising: a dummy field member having a plurality of pairs of coil receiving slots equally spaced about the periphery thereof; means supporting said dummy field member for rotation about a horizontal axis; a coil winding device; a transfer mechanism connected to said means supporting the dummy field member and adapted to move said dummy field member toward said winding device to present a pair of slots therein in position to receive coils wound by said winding device; and means for indexing said dummy field member about said horizontal axis after a coil is loaded in a pair of slots therein to present a different pair of slots in position to receive coils from said winding device.

26. In a coil winding machine having a loading station including a coil winding device, the combination comprising: a dummy field member having a plurality of pairs of coil receiving slots equally spaced about the periphery thereof; means supporting said dummy field member for rotation about a horizontal axis in position to receive coils wound by said winding device; and indexing means connected to said supporting means adapted to rotate said dummy field member about said horizontal axis whereby empty pairs of said coil receiving slots are sequentially positioned to receive coils from said winding device.

References Cited in the file of this patent
UNITED STATES PATENTS

| | | |
|---|---|---|
| 2,576,568 | Burge et al. | Nov. 27, 1951 |
| 2,624,374 | Burge et al. | Jan. 6, 1953 |
| 2,638,943 | Bugg | May 19, 1953 |
| 2,712,836 | Marzolf | July 12, 1955 |
| 2,780,246 | Steger | Feb. 5, 1957 |
| 2,836,204 | Mason | May 27, 1958 |
| 3,024,815 | Larsen | Mar. 13, 1962 |
| 3,036,603 | Moore | May 29, 1962 |

UNITED STATES PATENT OFFICE
CERTIFICATE OF CORRECTION

Patent No. 3,156,268                                                          November 10, 1964

Harry W. Moore

It is hereby certified that error appears in the above numbered patent requiring correction and that the said Letters Patent should read as corrected below.

Column 6, line 49, for "taken" read -- take --; column 7, line 6, for "on" read -- or --; line 25, for "is", first occurrence, read -- in --; column 9, line 59, for "is is" read -- it is --.

Signed and sealed this 20th day of April 1965.

(SEAL)
Attest:

ERNEST W. SWIDER                                                EDWARD J. BRENNER
Attesting Officer                                                   Commissioner of Patents